(12) United States Patent
Shirai

(10) Patent No.: US 8,665,478 B2
(45) Date of Patent: Mar. 4, 2014

(54) PRINTING SYSTEM, CONTROL METHOD OF THE SAME, PRINT SERVER, CONTROL METHOD OF THE PRINT SERVER, AND STORAGE MEDIUM

(75) Inventor: Kenichi Shirai, Ichikawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 32 days.

(21) Appl. No.: 13/355,325

(22) Filed: Jan. 20, 2012

(65) Prior Publication Data

US 2012/0188602 A1    Jul. 26, 2012

(30) Foreign Application Priority Data

Jan. 24, 2011 (JP) .................................. 2011-012044

(51) Int. Cl.
| | |
|---|---|
| G06F 3/12 | (2006.01) |
| G06K 15/02 | (2006.01) |
| H04N 1/00 | (2006.01) |
| H04N 1/40 | (2006.01) |

(52) U.S. Cl.
USPC .......... 358/1.15; 358/1.16; 358/1.6; 358/3.24

(58) Field of Classification Search
USPC ............. 358/1.15, 1.16, 1.13, 1.14, 3.24, 1.6, 358/402, 401, 444, 476, 448, 508, 539, 358/403; 709/223, 221, 201, 203, 208, 212, 709/217, 220, 227, 238, 245, 249; 710/1, 8, 710/10, 11, 14, 15, 16, 26, 32, 38, 42, 43, 710/46, 52, 104; 717/100, 120, 121, 169
See application file for complete search history.

(56) References Cited

U.S. PATENT DOCUMENTS

| | | | |
|---|---|---|---|
| 2001/0030766 A1* | 10/2001 | Yamamoto | 358/1.15 |
| 2001/0043352 A1* | 11/2001 | Brossman et al. | 358/1.13 |
| 2003/0005097 A1* | 1/2003 | Barnard et al. | 709/223 |
| 2004/0255263 A1* | 12/2004 | Ando | 717/100 |
| 2007/0146778 A1* | 6/2007 | Kitagata et al. | 358/1.15 |
| 2008/0186532 A1* | 8/2008 | Ogasawara | 358/1.15 |
| 2008/0239372 A1* | 10/2008 | Okamoto et al. | 358/1.15 |
| 2008/0297838 A1* | 12/2008 | Matsui et al. | 358/1.15 |

FOREIGN PATENT DOCUMENTS

JP       2003-296073 A    10/2003

* cited by examiner

Primary Examiner — Ngon Nguyen
(74) Attorney, Agent, or Firm — Canon U.S.A., Inc., IP Division

(57) ABSTRACT

A print server includes a registration unit configured to register a virtual printer according to a printer registration request received from a information processing apparatus, a storage unit configured to store printer information about the virtual printer registered by the registration unit, and a notification unit configured to notify the printing apparatus of a printer registration notification indicating that the virtual printer is registered by the registration unit, wherein the printer information is acquired by the printing apparatus which receives the printer registration notification.

8 Claims, 11 Drawing Sheets

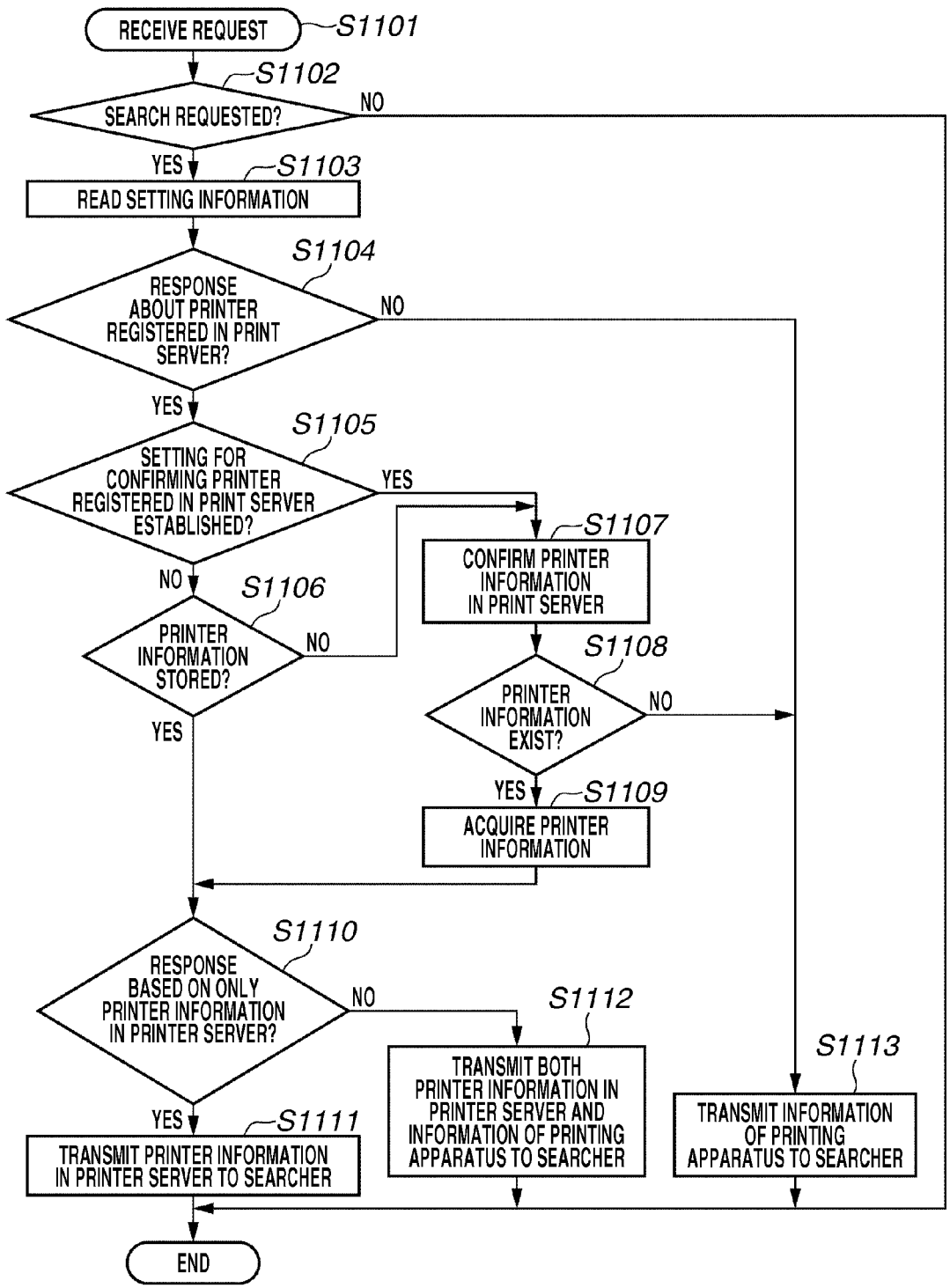

PRINTING SYSTEM, CONTROL METHOD OF THE SAME, PRINT SERVER, CONTROL METHOD OF THE PRINT SERVER, AND STORAGE MEDIUM

BACKGROUND OF THE INVENTION

1. Field of the Invention

The present invention relates to a printing system configured to generate a virtual printer on a client personal computer (PC), a printing apparatus, a control method for the printing system, a control method for the printing apparatus and a program.

2. Description of the Related Art

Recently, networking of printers and multifunctional peripherals has been progressed, so that generally, printing is performed by a target printer or a target multifunctional peripheral via a network according to an instruction from a host computer. In this case, a printer object, which acts as a target printer, is generated on the host computer, and, when printing based on an application, a user selects that printer object to execute the printing.

On the other hand, in the case of printing via a print server, a printer object corresponding to a virtual printer on the print server is generated on a client personal computer (PC). The user executes the printing to load a print job onto the print server. Loading the print job via the print server makes possible a synthetic print document control within a system, and further, utilization of a pull-print function and an equivalent function using an integrated circuit (IC) card.

The printer object may be generated by manually inputting an Internet protocol (IP) address or the like, and automatically generated by searching the network. When the printer object is generated by searching the network, the search needs to be implemented by limiting the range of the network. Consequently, there exists such an issue, for example, that any printer existing in any different range from the host computer may not be searched for.

To solve this issue, Japanese Patent Application Laid-Open No. 2003-296073 has discussed a method for specifying a network which a user wants to search and in which instead of the host computer, the search is performed by a Web server and its result is brought back to the host computer.

However, according to Japanese Patent Application Laid-Open No. 2003-296073, when using the print server, the user needs to understand the network in which the print server exists. Further, according to this method, the user may not confirm that the print server has a system for responding to a search and consequently, the user needs to register manually the network which he or she wished to search, whereby taking much time and labor.

SUMMARY OF THE INVENTION

The present invention is directed to a printing system which enables a user to easily generate a virtual printer existing on a print server on a client personal computer (PC) without being conscious of the network to be searched.

According to an aspect of the present invention, a printing system includes a printing apparatus, a print server, and an information processing apparatus. The information processing apparatus includes a printer registration request unit configured to transmit a printer registration request to the print server, and a search request unit configured to transmit a search request to the printing apparatus. The print server includes a registration unit configured to register a virtual printer according to a printer registration request received from the information processing apparatus, a storage unit configured to store printer information about the virtual printer registered by the registration unit, and a notification unit configured to notify the printing apparatus of a printer registration notification indicating that the virtual printer is registered by the registration unit. The printing apparatus includes an acquisition unit configured to acquire the printer information about the virtual printer corresponding to the printing apparatus in response to the printer registration notification notified from the print server, and a transmission unit configured to transmit the printer information acquired by the acquisition unit to the information processing apparatus in response to the search request received from the information processing apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 11 is a flow chart illustrating processing at the time of receiving a search request according to the exemplary embodiment of the present invention.

DESCRIPTION OF THE EMBODIMENTS

Various exemplary embodiments, features, and aspects of the invention will be described in detail below with reference to the drawings.

<System Configuration>

Figure 1:
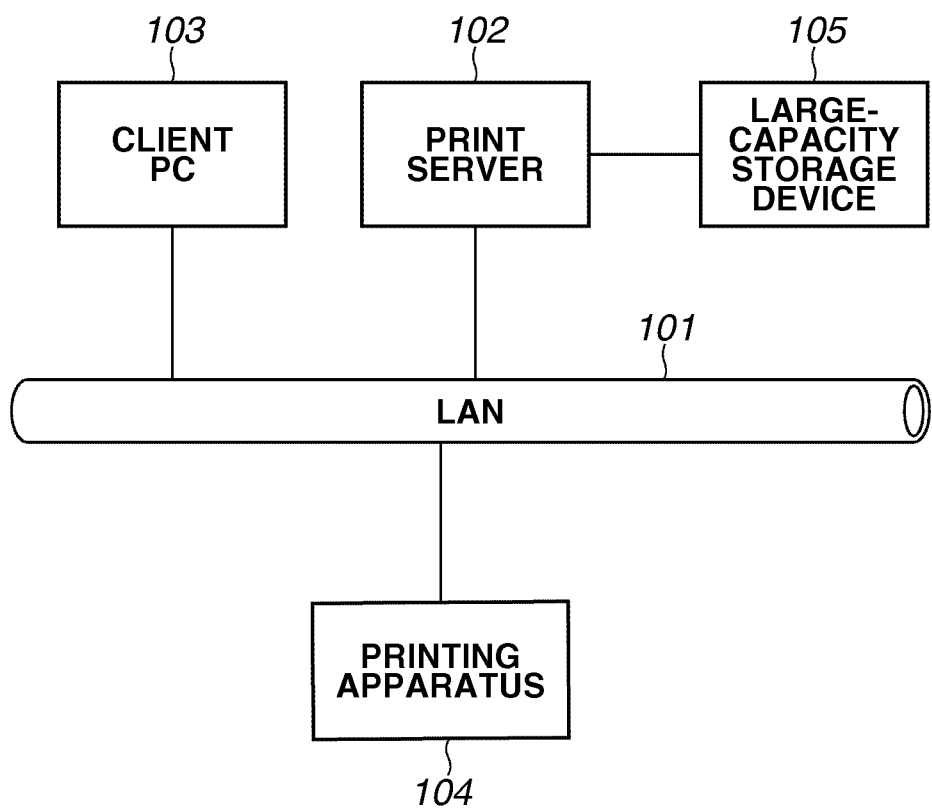
FIG. 1 is a block diagram illustrating a configuration of a printing system according to an exemplary embodiment of the present invention.

FIG. 1 is a block diagram illustrating a configuration of a printing system which is applied to an exemplary embodiment of the present invention. In FIG. 1, it is assumed that a plurality client PCs 103 and printing apparatuses 104 are connected to the printing system. A communication between units accommodated in the printing system may be wired communication using Ethernet (registered trademark) cable or the like or wireless communication using radio or light beam.

Referring to FIG. 1, a print server 102, the client PCs 103 and the printing apparatuses 104 are connected via a network 101 (i.e., local area network (LAN)). The print server 102 is a server computer which executes monitoring and management of the printing apparatus 104, monitoring and control of print jobs, receiving a print instruction from the client PC 103, storing document data into a large-capacity storage device 105 and transfer processing of print data to the printing apparatus 104.

The large-capacity storage device 105 stores print data, document data, print job information, printer information, and the like. The client PC 103 is a client computer which executes information processing and may communicate with the print server 102 and other client PC 103 via the LAN 101.

The printing apparatus 104 is an image formation apparatus connected to the LAN 101. The printing apparatus 104 communicates with the print server 102 via the LAN 101. As the printing apparatus 104, a various types of printing apparatuses such as a laser printer employing electrophotographic process, an ink jet printer employing ink jet process, a thermal transfer type printer are available. Further, the printing apparatus 104 is provided with a search response application 601, which will be described in detail below with reference to FIG. 7.

<Hardware Configuration of Server Computer and Client Computer>

Figure 2:
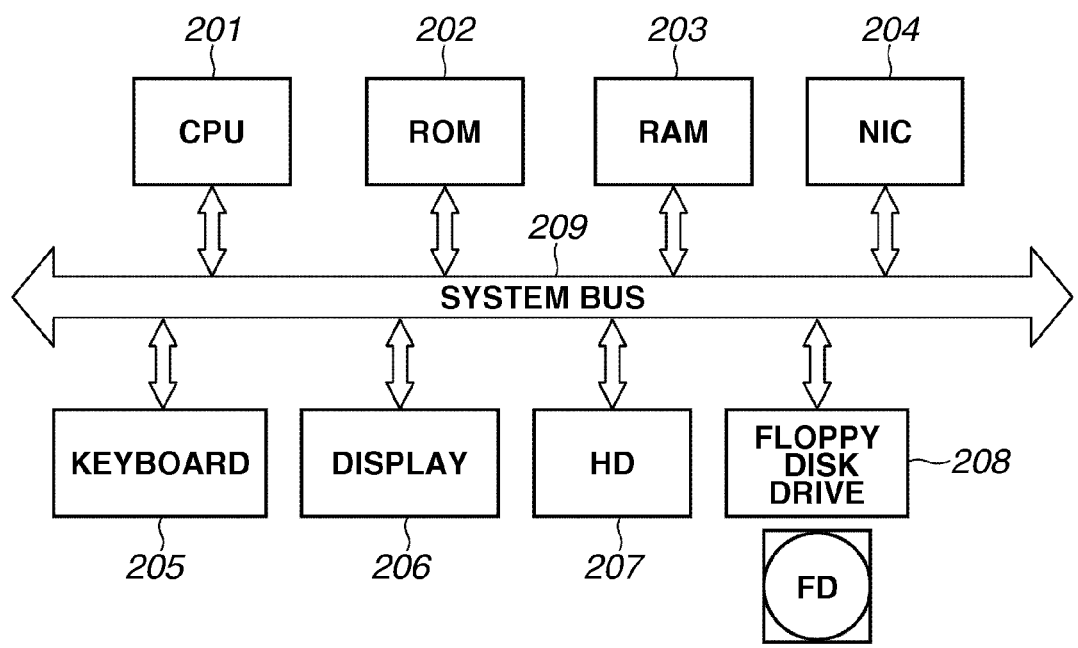
FIG. 2 illustrates a configuration of hardware of an information processing apparatus according to the exemplary embodiment of the present invention.

FIG. 2 illustrates the configuration of hardware of an information processing apparatus which is applied to the present exemplary embodiment. The print server 102 or the client PC 103 has the same or similar configuration to the information processing apparatus. If the function of the present invention is executable, the present invention may be applied to a single apparatus or device and a system including a plurality of apparatuses or devices unless otherwise described. Additionally, unless otherwise described, if the function of the present invention is executable, the present invention may be applied to even a system which is connected via LAN or wide area network (WAN) to execute the processing.

A central processing unit (CPU) 201 is a control unit of the information processing apparatus and executes an application program, a print driver program, an operating system, and a printing system program of the present invention, which are stored in a hard disk drive 207. Further, the CPU 201 performs control to temporarily store information and files necessary for executing those programs in a random access memory (RAM) 203. The CPU 201 opens various types of windows registered based on a command instructed by a mouse cursor (not illustrated) on a display 206 and executes various types of data processing. According to the present exemplary embodiment, the printer generation processing is executed via a window displayed on the display of the client PC 103.

A read-only memory (ROM) 202 is a storage unit, which stores various types of data pieces including programs such as basic input-output (I/O) program, font data used for document processing, and template data. The RAM 203 is a temporary storage unit, which functions as a main memory or a work area of the CPU 201. A network interface card (NIC) 204 is an interface serving as an I/O unit, via which the information processing apparatus exchanges data with an external apparatus.

A keyboard 205 is an instruction inputting unit, via which a user inputs an instruction into an external apparatus. The display 206 displays a command or the like input via the keyboard 205. A hard disk (HD) 207 is one of external storage units, which functions as a large-capacity memory storing an application program, a print driver program, an operating system (OS), and the like.

A floppy disk (FD) drive 208 reads a floppy disk and loads a print control program and related data directly onto the RAM 203 and executes that program. A medium for storing the print control program may be a compact disk (CD)-ROM, CD-readable (CD-R), a PC card, a digital versatile disk (DVD) or an integrated circuit (IC) memory card as well as the FD, and the information processing apparatus is preferred to include a drive suitable for each storage medium. A system bus 209 connects respective units constituting the information processing apparatus.

Figure 3:
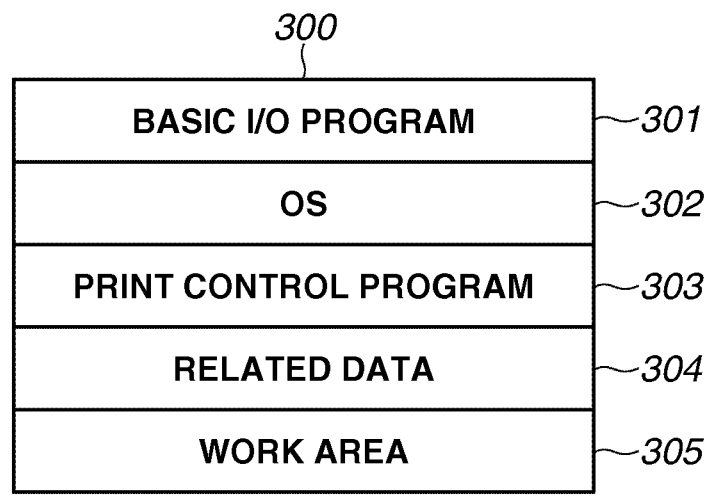
FIG. 3 illustrates an example of a memory map in a random access memory (RAM) according to the exemplary embodiment of the present invention.
Figure 3:
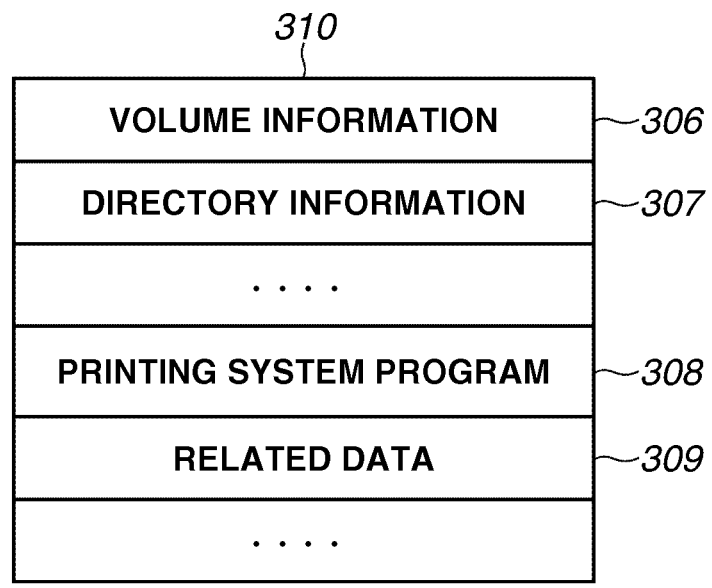

FIG. 3 illustrates an example of a memory map of the RAM 203 illustrated in FIG. 2, in which a print control program is loaded and is executable on the RAM 203. Although in the present exemplary embodiment an example is described in which the print control program and its related data pieces are loaded from the FD drive 208 directly onto the RAM 203 to be executed, the print control program and its related data pieces may be loaded onto the RAM 203 from the HD 207 in which the program has been already installed.

In the meantime, the print control program may be stored in the ROM 202 and configured as a part of the memory map, and may be executed directly by the CPU 201. The print control program may be configured of software for achieving the functions similar to the respective above-described units instead of the hardware.

In FIG. 3, a basic I/O program 301 is an area which contains such a program having initial program loading (IPL) function which allows an operating system (OS) 302 to be read into the RAM 203 from the HD 207 when the information processing apparatus is powered on to start the operation of the OS 302.

A print control program 303 controls the printing system in the present exemplary embodiment and may be stored in an area reserved on the RAM 203. Related data 304 is stored in an area reserved on the RAM 203. A work area 305 has an area for the CPU 201 to execute the print control program.

A memory map 310 is an example of the memory map read by the FD drive 208 illustrated in FIG. 2, indicating the content of the FD data to be read by the FD drive 208. The memory map 310 includes volume information 306 which indicates data information, directory information 307, printing system program of the present exemplary embodiment, and related data 309. The printing system program 308 is produced according to a flow chart described in the present exemplary embodiment. In the present exemplary embodiment, the printing system program is accommodated in the print server 102 with the same configuration.

<Software Configuration of Print Server>

Figure 4:
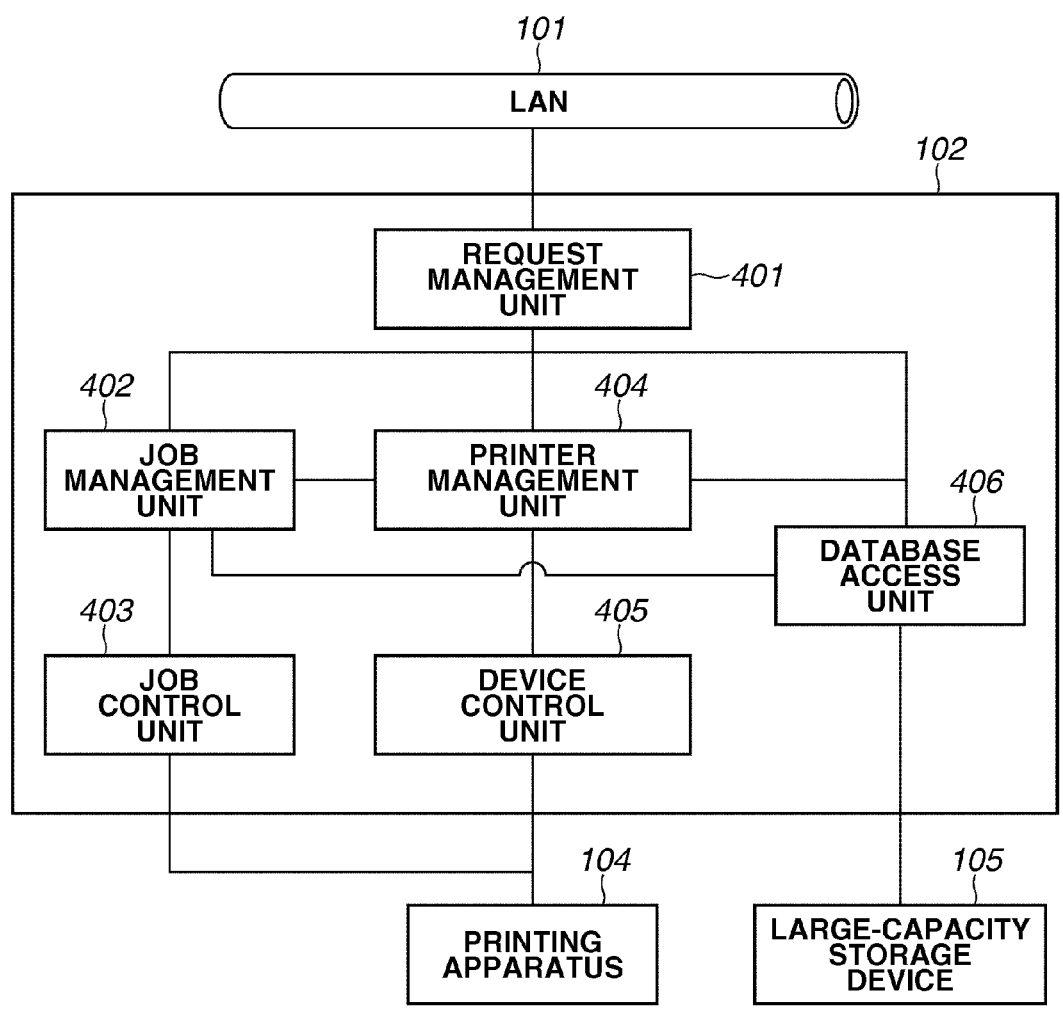
FIG. 4 illustrates a configuration of software of a print server according to the exemplary embodiment of the present invention.

FIG. 4 illustrates the configuration of software of the print server 102 according to the present exemplary embodiment. A request management unit 401 receives a print request or a printer registration request from the client PC 103 via the LAN 101. The print request described here refers to a print instruction issued by a user to the print server 102. The present exemplary embodiment assumes that the print instruction is issued via a user interface such as a web browser in the client PC. The printer registration request refers to a request for instructing the print server 102 to store the printer information of the printing apparatus 104

The detail of the printer information will be described below with reference to FIG. 8. The user specifies a printer name and an Internet protocol (IP) address when registering a printer. The user generates a printer object corresponding to the printer information on the client PC 103 and specifies the printer object to execute printing via the print server 102. A related print processing will not be described in detail because it is not related to the present exemplary embodiment.

When the request management unit 401 receives a print request, a job management unit 402 acquires print job information and print data from the large-capacity storage device 105 via a data base access unit 406. When receiving a print job, the job management unit 402 inquires a situation of the printing apparatus 104 from a printer management unit 404. If the printing apparatus 104 is in a normal condition, the job management unit 402 issues a job transmission instruction to a job control unit 403.

When receiving the job transmission instruction, the job control unit 403 transmits job data to the printing apparatus 104. In the present exemplary embodiment, a communication protocol to be used in transmission is not specifically restricted, and for example, a line printer daemon protocol (LPR), a RAW protocol, and an Internet printing protocol (IPP) are available.

If the request management unit 401 receives a printer registration request, the printer management unit 404 acquires configuration information of the printing apparatus 104 via a device control unit 405. Then, the printer management unit 404 stores the information to be specified when the printer registration is requested and the acquired configuration information into the large-capacity storage device 105 via the data base access unit 406.

After processing the printer registration request, the printer management unit 404 notifies the printing apparatus 104 that the printer registration is completed via the device control unit 405. The communication protocol to be used in communication is not limited to any particular one. The detail of the printer registration processing will be described below with reference to FIG. 10.

<Hardware Configuration of Printing Apparatus>

Figure 5:
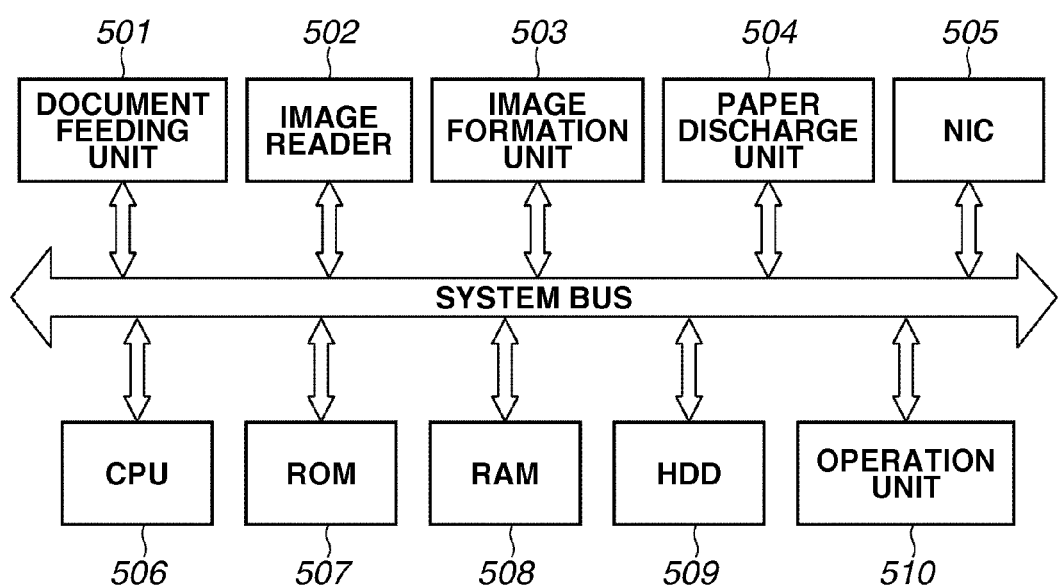
FIG. 5 illustrates an example of a configuration of hardware of a printing apparatus according to the exemplary embodiment of the present invention.

FIG. 5 illustrates an example of the configuration of hardware of the printing apparatus 104. An image reader 502 reads a document at a document feeding unit 501. The image reader 502 and an image formation unit 503 convert the read document or data received via network into a print image and print out the image. A paper discharge unit 504 discharges printed paper and then, performs such processing as sorting, stapling on the discharged paper. A network interface (NIC) 505 is connected to the LAN and Internet via the network to exchange information with the outside of the system.

A CPU 506 reads a program stored in a ROM 507 or an HDD 509 into a RAM 508 and executes the processing based on the read program to control each processing of the printing apparatus. The ROM 507, which is a nonvolatile storage device, stores a program and data concerning each processing of the printing apparatus.

The rewritable RAM 508 electrically stores temporary data relating to each processing of the printing apparatus. The HDD 509 stores a program and data relating to each processing of the printing apparatus and temporary data. An operation unit 510 displays a screen and receives an operation instruction from a user via the screen.

<Configuration of Printing Apparatus>

Figure 6:
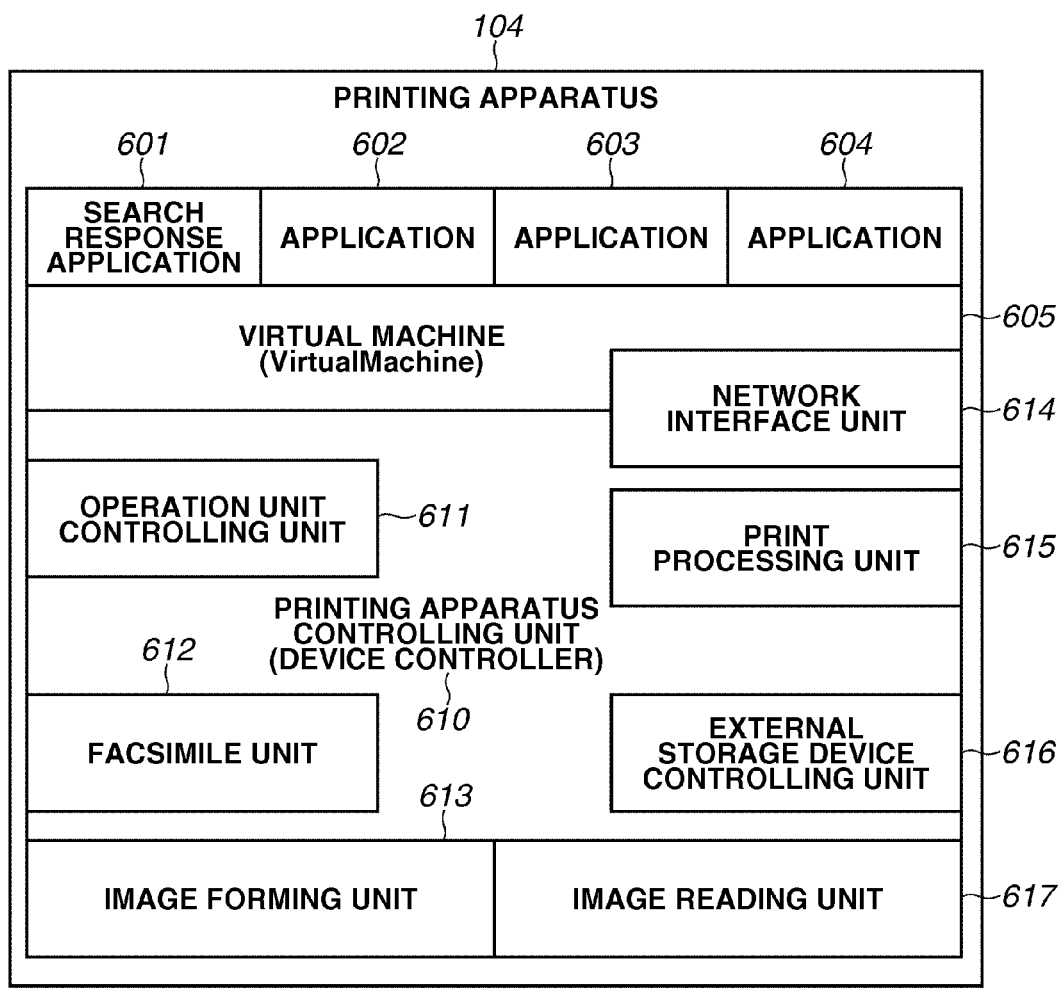
FIG. 6 illustrates the hierarchical configuration of the printing apparatus according to the exemplary embodiment of the present invention hierarchically.

FIG. 6 illustrates the configuration of the printing apparatus hierarchically. Referring to FIG. 6, an image forming unit 613 executes a series of image formation processes including handling of paper, transfer of an image, and fixing of the image to form the image on a recording medium such as recording paper. The image forming unit 613 includes, for example, an ink jet printer and an electrophotographic process image formation unit.

An image reading unit 617 includes a scanner or the like, and optically reads a document image and converts the document image to digital image information. The image reading unit 617 outputs the digital image information to the image forming unit 613 to form an image or transfers the digital image information to a facsimile unit 612 or a network interface unit 614 to transmit the digital image information via network.

A device controller 610 controls each operation of the image forming unit 613 and the image reading unit 617, and, for example, controls the image forming unit 613 to copy the document information read by the image reading unit 617. The device controller 610 includes a network interface unit 614, a print processing unit 615, the facsimile unit 612, and an operation unit controlling unit 611 and controls exchange of information between these units.

The facsimile unit 612 receives and transmits a facsimile image. More specifically, the facsimile unit 612 transmits the digital image information read by the image reading unit 617, and conversely, decodes a received facsimile signal and causes the image forming unit 613 to record the decoded image.

The operation unit controlling unit 611 generates a signal corresponding to a user's operation via an operation panel of the operation unit and displays various types of data pieces and messages on the operation unit (or the display unit).

The print processing unit 615 performs control to process print data input via the network interface unit 614 and to output the processed data to the image forming unit 613 to print it. The network interface unit 614 controls data communication with other communication terminals via the communication line.

A virtual machine 605 is located higher than the device controller 610 so that the virtual machine 605 is capable of controlling the device controller 610. The network interface unit 614 may be used directly by both the device controller 610 and the virtual machine 605, so that the device controller 610 and the virtual machine 605 may access an external network independently of each other.

Further, an application described with a programming language corresponding to an application programming interface (API) provided by the virtual machine 605 exists on a higher level than the virtual machine 605. The applications manage the device controller 610 indirectly via the virtual machine 605 and activates the image forming unit 613 and the image reading unit 617. The present exemplary embodiment includes the search response application 601. The search response application will be described in detail below with reference to FIG. 7.

The applications may be uninstalled from the virtual machine 605 or newly installed on the virtual machine 605 as applications 602 to 604. Although, in the present exemplary embodiment, the application is described as the application installed in the printing apparatus 104, the application of the present exemplary embodiment may be provided in the form of hardware. Further, the application may be provided as an application on a computer communicably connected to the printing apparatus 104.

An external storage device controlling unit 616 converts an image read by the image reading unit 617 to a data format which may be stored in the external storage device using the image forming unit 613 and stores its result in the external storage device. The external storage device controlling unit 616 reads data stored in the external storage device and prints out the read data via the image forming unit 613 or transmits out the data via the network interface unit 614.

<Software Configuration of Search Response Application>

Figure 7:
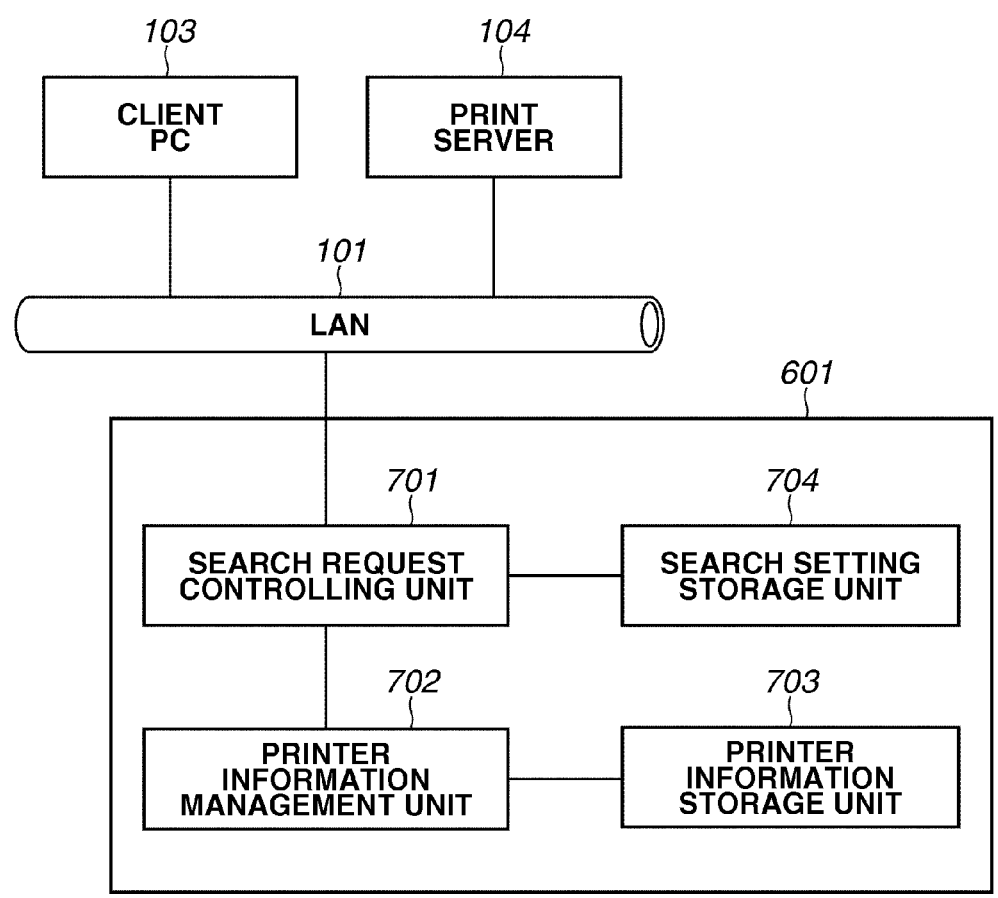
FIG. 7 is a block diagram illustrating a configuration of a search response application according to the exemplary embodiment of the present invention.

FIG. 7 is a block diagram illustrating the configuration of the search response application 601. The search response application 601 includes a search request controlling unit 701, a printer information management unit 702, a printer information storage unit 703, and a search setting storage unit 704.

The search request control unit 701 receives a search request from the client PC 103 and a printer registration notification from the print server 102 via the LAN 101. In the present exemplary embodiment, it is assumed that the search request is a general printer retrieval function provided on the client PC 103.

When receiving the search request from the client PC 103, the search request control unit 701 acquires printer information registered in the printer information storage unit 703 via the printer information management unit 702 and notifies the client PC 103 of the acquired printer information. When receiving the printer registration notification from the print server 102, the search request control unit 701 acquires the printer information from the print server 102 and registers the printer information in the printer information storage unit 703 via the printer information management unit 702.

The search setting storage unit 704 stores search setting information which is a setting for an operation of the search response application 601 when receiving a search request. According to the setting stored in the search setting storage unit 704, the search response application changes the content of the response. Storage of the operation setting into the search setting storage unit 704 is performed by a user's operation via the operation unit 510 of the printing apparatus 104. The search setting information will be described below with reference to FIG. 9.

<Printer Information>

Figure 8:
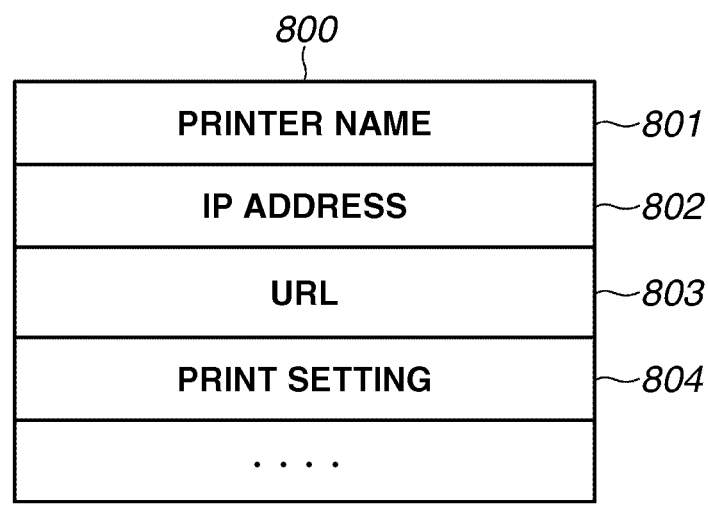
FIG. 8 illustrates printer information according to the exemplary embodiment of the present invention.

FIG. 8 illustrates an example of printer information stored by the print server 102 or the search response application 601. Printer information 800 is stored in the large-capacity storage device 105 to meet a user's printer registration request.

A printer name 801 is a unique name in the print server 102, which is information for a user to identify a printing apparatus in the print server 102. An IP address 802 is set in the printing apparatus 104. The print server 102 communicates with the printing apparatus 104 based on the IP address 802.

A uniform resource locator (URL) 803 is information set in port information of a printer object on the client PC 103. Using the URL 803, the client PC 103 specifies a printer on the print server 102. Print setting 804 is information relating to print setting for a print job including two-sided print setting, page layout setting, color setting, and printing quantity setting.

<Search Setting Information>

Figure 9:
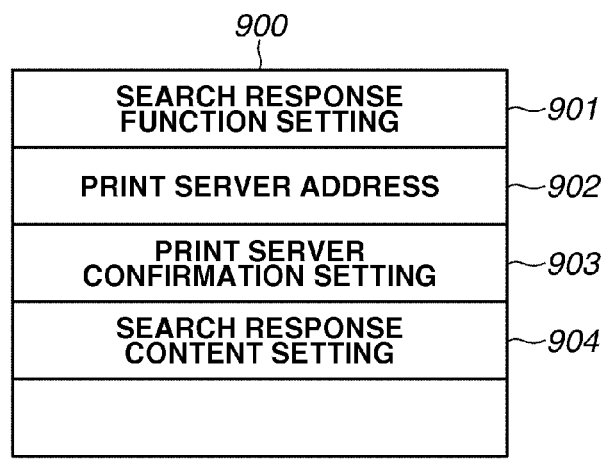
FIG. 9 illustrates search setting information according to the exemplary embodiment of the present invention.
Figure 9:
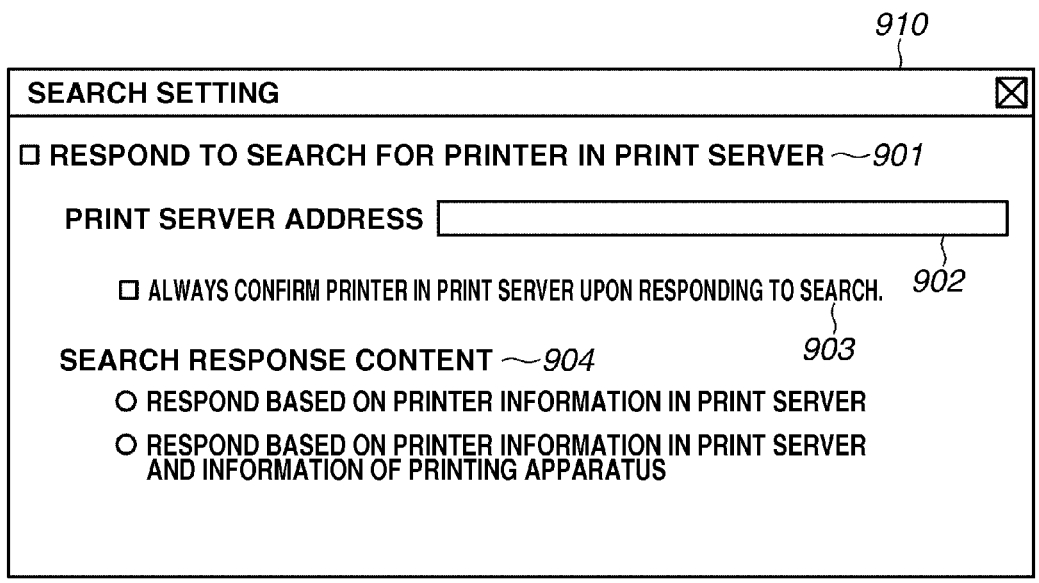

FIG. 9 illustrates an example of search setting information stored by the search setting storage unit. As illustrated in FIG. 9, search setting information 900 includes search response function setting 901, print server address 902, print server confirmation setting 903, and search response content setting 904.

The search response function setting 901 includes a setting indicating whether the search response function of the present exemplary embodiment is used. If use of the search response function is set in the search response function setting 901, the search response application 601 responds to the search using the printer information 800 of a virtual printer registered in the print server 102. When use of the search response function is not set in the search response function setting 901, the search response application 601 responds to the search using the printer information of the printing apparatus 104.

The print server address 902 is address information for the search response application 601 to specify the print server 102 and communicate therewith, and stores an IP address and a host name. The print server confirmation setting 903 stores a setting indicating whether the search response application 601 will respond to the search by updating the printer information each time after confirming the printer information in the print server 102.

The search response content setting 904 stores a setting indicating whether the response to the search will be executed with only the printer information in the print server 102 or together with the printer information in the printing apparatus 104.

A setting screen 910 is an example of the screen for setting the search response application. Although it is assumed that the setting screen 910 is set up via the operation unit 510, the setting screen 910 may be set up, for example, by an external apparatus such as the client PC 103 via a web page provided by the printing apparatus 104. Information set by the user is stored in the search setting storage unit 704. Items 901 to 904 in the screen correspond to the search setting information pieces 901 to 904.

<Processing at the Time of Printer Registration>

Figure 10:
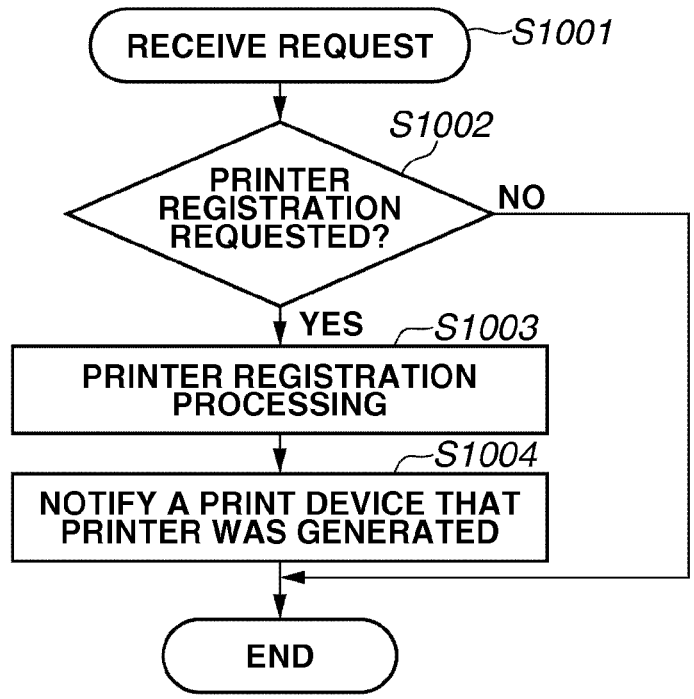
FIG. 10 is a flow chart illustrating processing at the time of receiving a printer registration request according to the exemplary embodiment of the present invention.
Figure 10:
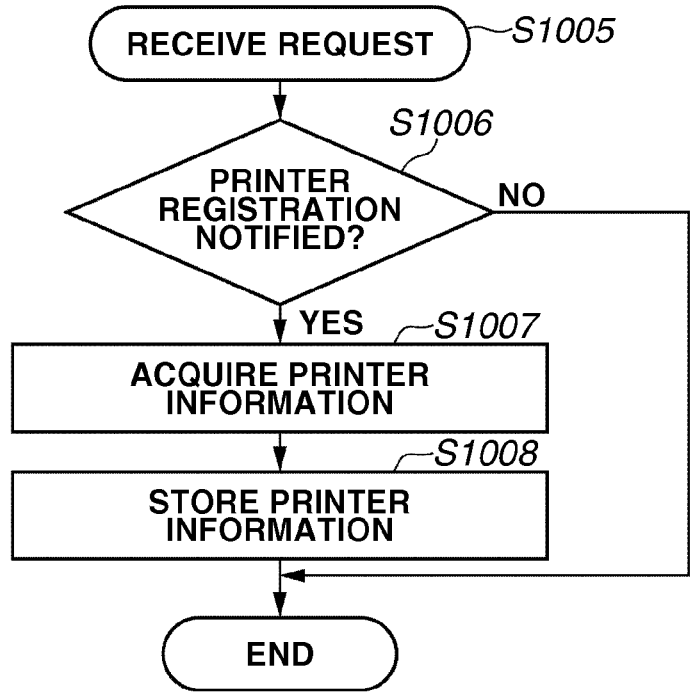

FIG. 10 illustrates a processing flow of the print server 102 when receiving a printer registration request from a user and a processing flow of a search response application 601 in the printing apparatus 104 to be registered.

<Print Server Processing at the Time of Printer Registration>

In step S1001, the request management unit 401 of the print server 102 receives a request from the client PC 103. In step S1002, the request management unit 401 determines whether the request received in step S1001 is a printer registration request. If it is determined that the request is the printer registration request (YES in step S1002), the processing proceeds to step S1003. Whereas if the request is determined to be other than the printer registration request (NO in step S1002), the processing ends.

In step S1003, the request management unit 401 instructs the printer management unit 404 to register a printer. After receiving the printer registration instruction, according to information included in the received request, the printer management unit 404 registers the virtual printer and at the same time, stores the printer information 800 in the large-capacity storage unit 105 via the data base access unit 406.

In step S1004, the printer management unit 404 specifies the printing apparatus 104 corresponding to the virtual printer registered based on the IP address 802 of the printer information 800. Then, the printer management unit 404 notifies the search response application 601 in the printing apparatus 104 that the virtual printer has been registered (printer registration notification) via the device control unit 405.

Although the processing flow of the present exemplary embodiment describes only a case where a printer registration is requested, it is naturally assumed that a printer setting change request and a printer deletion request are similarly notified to the search response application.

<Search Response Application Processing at the Time of Printer Registration>

In step S1005, the search request control unit 701 of the search response application 601 receives the request from the print server 102.

In step S1006, the search request control unit 701 determines whether the request received in step S1005 is the printer registration notification. If it is determined that the received request is the printer registration notification (YES in step S1006), the processing proceeds to step S1007. If it is determined as other than the printer registration notification (NO in step S1006), the processing ends.

In step S1007, the printer information management unit 702 acquires the printer information 800 of the printing apparatus 104 stored in the large-capacity storage device 105 via the print server 102. In the meantime, the printer information 800 is specified according to the IP address. The acquisition of the printer information may be performed from the printer registration notification because the printer registration notification contains the printer information 800. In step S1008, the printer information management unit 702 stores the printer information 800 acquired in step S1007 into the printer information storage unit 703.

When the above-described processing of the flowchart is executed, the printer information serving as the virtual printer registration information is also stored in the printing apparatus 104 which is a real object corresponding to the virtual printer registered in the print server 102.

In the meantime, it is assumed that a plurality of virtual printers is generated in the print server 102. Consequently, a plurality of the printer information pieces 800 exists. The individual information pieces are distinguished according to each printer name 801.

<Search Response Processing>

FIG. 11 illustrates a processing flow of a case where the search response application 601 in the printing apparatus 104 receives a search request. In step S1101, the search request control unit 701 receives a request from the client PC 103.

In step S1102, the search request control unit 701 determines whether the request received in step S1101 is a search request. If it is determined that the received request is the search request (YES in step S1102), the processing proceeds to step S1103. If it is determined as other than the search request (NO in step S1102), the processing ends.

In step S1103, the search request control unit 701 acquires the search setting information 900 from the search setting storage unit 704.

In step S1104, the search request control unit 701 confirms the search response function setting 901 of the search setting information 900 acquired in step S1103 and determines whether a setting for responding to the printer information 800 of the virtual printer registered in the print server 102 is established. If the setting for responding to the printer information 800 of the virtual printer is established (YES in step S1104), the processing proceeds to step S1105. If the setting is not established (NO in step S1104), the processing proceeds to step S1113.

In step S1105, the search request control unit 701 confirms the print server confirmation setting 903 of the acquired search setting information 900, and determines whether a setting for responding to a search after updating the printer information is established. If the setting for responding to the search after updating the printer information is established (YES in step S1005), the processing proceeds to step S1107. If the setting is not established (NO in step S1105), the processing proceeds to step S1106.

In step S1106, the search request control unit 701 determines whether the printer information 800 exists in the printer information storage unit 703 via the printer information management unit 702. If the printer information 800 exists in the printer information storage unit 703 (YES in step S1106), the processing proceeds to step S1110, and if not (NO in step S1106), the processing proceeds to step S1107.

In step S1107, the search request control unit 701 determines whether the printer information 800 exists in the print server 102.

In step S1108, if as a result of the determination by the search request control unit 701 in step S1107, the printer information 800 exists (YES in step S1108), the processing proceeds to step S1109, and otherwise (NO in step S1108), the processing proceeds to step S1113. In step S1109, the search request control unit 701 acquires the printer information 800 from the print server 102.

In step S1110, the search request control unit 701 confirms the search response content setting 904 of the acquired search setting information 900 and determines whether a setting for responding to the search based on only the printer information in the print server 102 is established. If the setting for responding to the search based on only the printer information in the print server 102 is established (YES in step S1101), the processing proceeds to step S1111. On the other hand, if the setting for responding to the search based on only the printer information in the print server 102 is not established and a setting for responding based on the printer information in the printing apparatus as well is established (NO in step S1110), the processing proceeds to step S1112.

In step S1111, the search request control unit 701 responds to the search by transmitting only the printer information 800 of the virtual printer registered in the print server 102 to the client PC 103.

In step S1112, the search request control unit 701 responds to the search by transmitting both the printer information 800 of the virtual printer registered in the print server 102 and the printer information of the printing apparatus 104 to the client PC 103.

In step S1113, the search request control unit 701 responds to the search by transmitting only the printer information of the printing apparatus 104 to the client PC 103.

As described above, the search response application has the printer information of the virtual printer in the print server and responds to the search. Consequently, the user may generate the printer in the print server by the same operation as when generating the printer by an ordinary search.

In the meantime, when the printer information pieces both of the print server 102 and the printing apparatus 104 are transmitted, both of them may be displayed on the client PC 103 such that they are distinguishable from each other. Although, as a method for making the both printer information pieces distinguishable from each other, changing displayed colors, displaying words "virtual printer" to indicate the printer information of the print server 102 and the like are available, the method is not restricted to the aforementioned examples.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-012044 filed Jan. 24, 2011, which is hereby incorporated by reference herein in its entirety.

What is claimed is:

1. A printing system comprising:
a printing apparatus;
a print server; and
an information processing apparatus,
wherein the information processing apparatus includes one or more processors configured to cause the information processing apparatus to
transmit a printer registration request to the print server; and
transmit a search request to the printing apparatus,
the print server includes one or more processors configured to cause the print server to
register a virtual printer according to a printer registration request received from the information processing apparatus;
store printer information about the virtual printer registered; and
notify the printing apparatus of a printer registration notification indicating that the virtual printer is registered,
the printing apparatus includes one or more processors configured to cause the printing apparatus to
acquire the printer information about the virtual printer corresponding to the printing apparatus in response to the printer registration notification notified from the print server; and
transmit the acquired printer information to the information processing apparatus in response to the search request received from the information processing apparatus.

2. The printing system according to claim 1,
wherein the printer registration notification includes the printer information and, the printing apparatus acquires the printer information from the printer registration notification.

3. A method for controlling a printing system in which a printing apparatus, a print server, and an information processing apparatus are communicably connected to each other via a network, the method comprising:
transmitting a printer registration request from the information processing apparatus to the print server;
registering, at the print server, a virtual printer according to a printer registration request received from the information processing apparatus;
storing, at the print server, printer information about the registered virtual printer;
notifying the printing apparatus of a printer registration notification indicating that the virtual printer is registered by the print server;
acquiring the printer information about the virtual printer corresponding to the printing apparatus in response to the printer registration notification notified from the print server;
transmitting a search request from the information processing apparatus to the printing apparatus; and
transmitting the printer information acquired by the printing apparatus to the information processing apparatus in response to the search request received from the information processing apparatus.

4. The method according to claim 3,
wherein the printer registration notification includes the printer information,
the method further comprising acquiring the printer information from the printer registration notification.

5. A non-transitory computer-readable storage medium storing a program for executing the method of claim 3.

6. A print server comprising one or more processors configured to cause the print server to
register a virtual printer according to a printer registration request received from an information processing apparatus;
store printer information about the virtual printer registered by the registration unit; and
notify the printing apparatus of a printer registration notification indicating that the virtual printer is registered by the registration unit,
wherein the printer information is acquired by the printing apparatus which receives the printer registration notification.

7. A method comprising:
registering, at a print server, a virtual printer according to a printer registration request received from an information processing apparatus;
storing, at the print server, printer information about the virtual printer registered; and
notifying a printing apparatus of a printer registration notification indicating that the virtual printer is registered by the print server,
wherein the printer information is acquired by the printing apparatus which receives the printer registration notification.

8. A non-transitory computer-readable storage medium storing a program for executing the method of claim 7.

* * * * *